United States Patent
Inamdar et al.

(10) Patent No.: US 9,858,093 B2
(45) Date of Patent: Jan. 2, 2018

(54) MODEL FOR CONFIGURATION INDEPENDENT PROCESS TEMPLATES AND BUSINESS CATALOG

(71) Applicant: Oracle International Corporation, Redwood Shores, CA (US)

(72) Inventors: Sonali Vijay Inamdar, Belmont, CA (US); Subhadarshi Mishra, San Jose, CA (US); Kristipati Peddanna, Berkshire (GB)

(73) Assignee: Oracle International Corporation, Redwood Shores, CA (US)

( * ) Notice: Subject to any disclaimer, the term of this patent is extended or adjusted under 35 U.S.C. 154(b) by 318 days.

(21) Appl. No.: 13/790,475

(22) Filed: Mar. 8, 2013

(65) Prior Publication Data
US 2014/0258983 A1    Sep. 11, 2014

(51) Int. Cl.
G06F 9/44 (2006.01)
G06F 9/445 (2006.01)
G06F 17/24 (2006.01)
G06F 9/50 (2006.01)

(52) U.S. Cl.
CPC ........ *G06F 9/44505* (2013.01); *G06F 9/5072* (2013.01); *G06F 17/248* (2013.01); *G06F 8/61* (2013.01); *G06F 8/71* (2013.01)

(58) Field of Classification Search
CPC .......... G06F 8/71; G06F 9/5072; G06F 17/50; H04L 67/306
USPC ............... 717/121; 705/7, 8; 709/1; 715/205
See application file for complete search history.

(56) References Cited

U.S. PATENT DOCUMENTS

| | | | |
|---|---|---|---|
| 6,505,210 B1 * | 1/2003 | Frey ........................ | G06F 9/465 |
| 7,111,231 B1 * | 9/2006 | Huck et al. ................... | 715/205 |
| 8,069,435 B1 * | 11/2011 | Lai ........................ | G06Q 10/10 |
| | | | 717/106 |
| 2002/0046228 A1 * | 4/2002 | Scheifler et al. ................. | 709/1 |
| 2003/0083910 A1 * | 5/2003 | Sayal ..................... | G06Q 10/10 |
| | | | 717/102 |

(Continued)

FOREIGN PATENT DOCUMENTS

FR    2068243 A1 *  6/2009   .......... G06F 9/5038

OTHER PUBLICATIONS

Oracle White Paper "Metadata Services (MDS) in Fusion Middleware 11g"; Dec. 2009; 24 pages.

*Primary Examiner* — Lewis A Bullock, Jr.
*Assistant Examiner* — Gilles Kepnang
(74) *Attorney, Agent, or Firm* — Trellis IP Law Group, PC

(57) ABSTRACT

A system and method for facilitating configuring service references to be called by a software application. An example method includes providing a catalog of processes, wherein the catalog of processes includes information identifying one or more services to be called to implement one or more processes; determining one or more service references occurring in a business process template that are used to implement one or more processes identified in the catalog of business processes; interchanging the one or more service references with one or more tokens in the process template, resulting in a tokenized template in response thereto; and running one or more processes in accordance with the tokenized template. In a more specific embodiment, the example method further includes employing a build system implemented via middleware to tokenize the process template to yield the tokenized template in response thereto.

16 Claims, 4 Drawing Sheets

(56) References Cited

U.S. PATENT DOCUMENTS

| | | | |
|---|---|---|---|
| 2005/0091174 A1* | 4/2005 | Akkiraju | G06Q 20/401 705/75 |
| 2008/0120600 A1* | 5/2008 | Deimel et al. | 717/121 |
| 2008/0155518 A1* | 6/2008 | Van Wyk | G06Q 10/06 717/142 |
| 2008/0301641 A1* | 12/2008 | Bojjireddy et al. | 717/121 |
| 2009/0063225 A1* | 3/2009 | Baeyens et al. | 705/7 |
| 2009/0125612 A1* | 5/2009 | Rabetge | H04L 67/306 709/220 |
| 2009/0319981 A1* | 12/2009 | Akkiraju | G06F 8/10 717/104 |
| 2010/0077386 A1* | 3/2010 | Akkiraju | G06F 8/35 717/136 |
| 2010/0313119 A1* | 12/2010 | Baldwin et al. | 715/256 |
| 2011/0054974 A1* | 3/2011 | Bobst et al. | 705/8 |
| 2011/0060842 A1* | 3/2011 | Reese | G06Q 10/10 709/232 |
| 2011/0196659 A1* | 8/2011 | Salle | G06F 17/50 703/6 |
| 2011/0196940 A1* | 8/2011 | Martinez et al. | 709/217 |
| 2012/0054720 A1* | 3/2012 | Klein et al. | 717/125 |
| 2012/0124554 A1* | 5/2012 | Tam | 717/121 |
| 2013/0019018 A1* | 1/2013 | Rice | H04L 12/66 709/226 |
| 2013/0282746 A1* | 10/2013 | Balko | G06Q 10/06 707/758 |
| 2014/0032484 A1* | 1/2014 | Cameron et al. | 707/607 |
| 2014/0075032 A1* | 3/2014 | Vasudevan | G06F 9/5072 709/226 |

* cited by examiner

MODEL FOR CONFIGURATION INDEPENDENT PROCESS TEMPLATES AND BUSINESS CATALOG

BACKGROUND

The present application relates to software and more specifically to software-based systems and methods for facilitating configuring and running a set of software processes that are implemented via one or more software services, such as Web services.

Software for facilitating configuring and running applications that employ service processes are employed in various demanding applications, including Enterprise Resource Planning (ERP), scientific distributed computing applications, and so on. Such applications often demand easily configurable, scalable, and portable Service Oriented Architectures (SOAs) that can be efficiently and accurately customized and deployed in various networked computing environments.

Readily scalable and configurable sets of software processes, i.e., applications, are particularly important in enterprise applications, such as software delivering process lifecycle management or process automation solutions Workforce Lifecycle Management (WLM) and Business Process Management (BPM) applications, where a given application may reference many services, such as services for facilitating automating various lifecycle management operations. A given lifecycle management/automation solution may include various services that perform parts of the lifecycle solution. Examples of lifecycle management/automation solutions include employee onboarding and offboarding software applications.

A given enterprise application may employ a collection of strategically sequenced service processes specified via a business process template, also called a process automation template. The business process template may include references, such as Uniform Resource Locators (URLs), specifying network addresses of services or service components to be executed as part of the application.

Conventionally, when configuring an application for deployment, a developer uses a configuration plan file to organize service references in preparation for deployment of an application that uses associated services. The developer may employ additional software, such as systems management or configuration management software, to determine proper reference addresses, i.e., endpoint locations for service references. The developer then manually updates the configuration plan based on the determined proper reference addresses.

However, the need to use additional software (e.g., systems management software) to manually update a configuration plan for each service reference may be particularly tedious and error prone, especially in Software As A Service (SAAS) architectures and so-called fast deployment models (and related Rapid Application Development (RAD) models), where end users often lack service host information. Furthermore, as the number of service references increases, configuration complexity may become prohibitive, thereby inhibiting application scalability and customizability. Accordingly, conventional methods for deploying template processes often lack effective mechanisms for facilitating managing complex software configurations.

SUMMARY

An example method for facilitating configuring one or more references to a software service to be called by a software application includes providing a catalog of processes, wherein the catalog of processes includes information identifying one or more services to be called to implement one or more processes; determining one or more service references occurring in a business process template that are used to implement one or more processes identified in the catalog of business processes; interchanging the one or more service references with one or more tokens in the process template, resulting in a tokenized template in response thereto, wherein the one or more tokens encode the one or more references in accordance with a token naming convention; and running a set of one or more processes in accordance with the tokenized template, including resolving the tokens and invoking one or more services identified thereby.

In a more specific embodiment, the one or more processes include one or more business processes. The example method further includes employing a tokenization module of a build system, which communicates with the catalog of processes (i.e., business process catalog), to tokenize the process template to yield the tokenized template. The tokenized template is published to a MetaData Services (MDS) repository.

The example method further includes employing BPM software and an accompanying token resolver to access the published tokenized template maintained by MDS repository and to facilitate resolving tokens in the tokenized business process template. The BPM software includes a runtime module in communication with metadata services software that is adapted to facilitate referencing the tokenized business process template and invoking services and associated tasks identified thereby.

The example method further includes providing a user interface, including Graphical User Interface (GUI) software, which may communicate with the process catalog and the process template. The GUI software enables a user to customize a business process template as per their business needs, such as by adding, deleting, and/or modifying service references and/or other process configuration information in the process template. When services are added from the exposed catalog of services, then "auto tokenization" may occur, such that the references are pre-tokenized. Accordingly, users need not know actual physical addresses of service references, which would be particularly problematic in SAAS environments.

In a more specific embodiment, the interchanging step includes employing a build system to tokenize service references in the process template. The running step further includes employing a Service Oriented Architecture (SOA) server to resolve one or more tokens of the tokenized template. Middleware that implements a metadata services layer is adapted to selectively invoke performance of one or more tasks associated with services identified in the process template in response to a signal from BPM software. Example tasks include a task pertaining to adjusting benefits of an employee of an enterprise; a task pertaining to adjusting compensation of an employee of an enterprise, a task pertaining to employee performance management, and so on.

Accordingly, certain embodiments discussed herein may involve employing a build system to replace developer specified design time MDS service references in a business process template with tokens. The resulting tokenized template is published to an MDS repository, and an SOA server facilitates resolving the tokens to actual values.

Hence, certain embodiments discussed herein provide efficient mechanisms for reducing complexity when configuring and deploying applications that use cataloged services (or other distributed functionality) by replacing service references in a process template with tokens. The tokens are constructed according to a token naming convention that enable tokens to be resolved to determine network locations of applications that directly host referenced services. Hence, configuration complexities (e.g., Domain:Cluster:Server) are abstracted away. When a new service call is added from a catalog of services, the call is effectively tokenized.

Such methods may facilitate domain independence for service references, virtually eliminating the need for developers to know specific physical system configuration information, e.g., host name, port number, protocol, and so on. Furthermore, such methods mitigate the need for developers to rely upon additional tools and applications, e.g., Systems management software or Web Logic Scripting Tool (WLST) to determine service endpoints (specifying physical locations of services). Furthermore, such tokenization of business process templates may facilitate project portability, such that projects and associated applications can be readily moved from test to deployment/production phases.

Furthermore, such methods may greatly facilitate customization of business process templates, customization of which may otherwise be prohibitive, e.g., due to configuration complexities. This is especially true for fast deployment SAAS models, where substantial configuration complexity and accompanying lack of user knowledge of physical addresses corresponding to relative service references are common.

A further understanding of the nature and the advantages of particular embodiments disclosed herein may be realized by reference of the remaining portions of the specification and the attached drawings.

DETAILED DESCRIPTION OF EMBODIMENTS

For the purposes of the present discussion, an enterprise may be any organization of persons, such as a business, university, government, military, and so on. The terms "organization" and "enterprise" are employed interchangeably herein. Personnel of an organization, i.e., enterprise personnel, may include any persons associated with the organization, such as employees, contractors, board members, customer contacts, and so on.

Enterprise Resource Planning (ERP) software may be any set of computer code that is used by an enterprise or organization. Examples of enterprise software classifications include HCM (Human Capital Management) software, CRM (Customer Relationship Management) software; BI (Business Intelligence) software, and so on. Examples of ERP software applications include Financials, Assets, Procurement, Projects, Supply Chain, and so on. The terms "ERP software" and "ERP application" may be employed interchangeably herein.

Enterprise software applications, such as Customer Relationship Management (CRM), Business Intelligence (BI), and project management software, often include databases with various database objects, also called data objects or entities. An enterprise application that includes or communicates with a database is called an enterprise database application herein.

Enterprise data may be any information pertaining to an organization or business, including information about projects, tasks, resources, orders, enterprise personnel and so on. Examples of enterprise data include descriptions of work orders, asset descriptions, photographs, contact information, calendar information, enterprise hierarchy information (e.g., corporate organizational chart information), and so on.

For clarity, certain well-known components, such as hard drives, processors, operating systems, power supplies, routers, Internet Service Providers (ISPs), Enterprise Service Busses (ESBs), client computers, and so on, have been omitted from the figures. However, those skilled in the art with access to the present teachings will know which components to implement and how to implement them to meet the needs of a given implementation.

Figure 1:
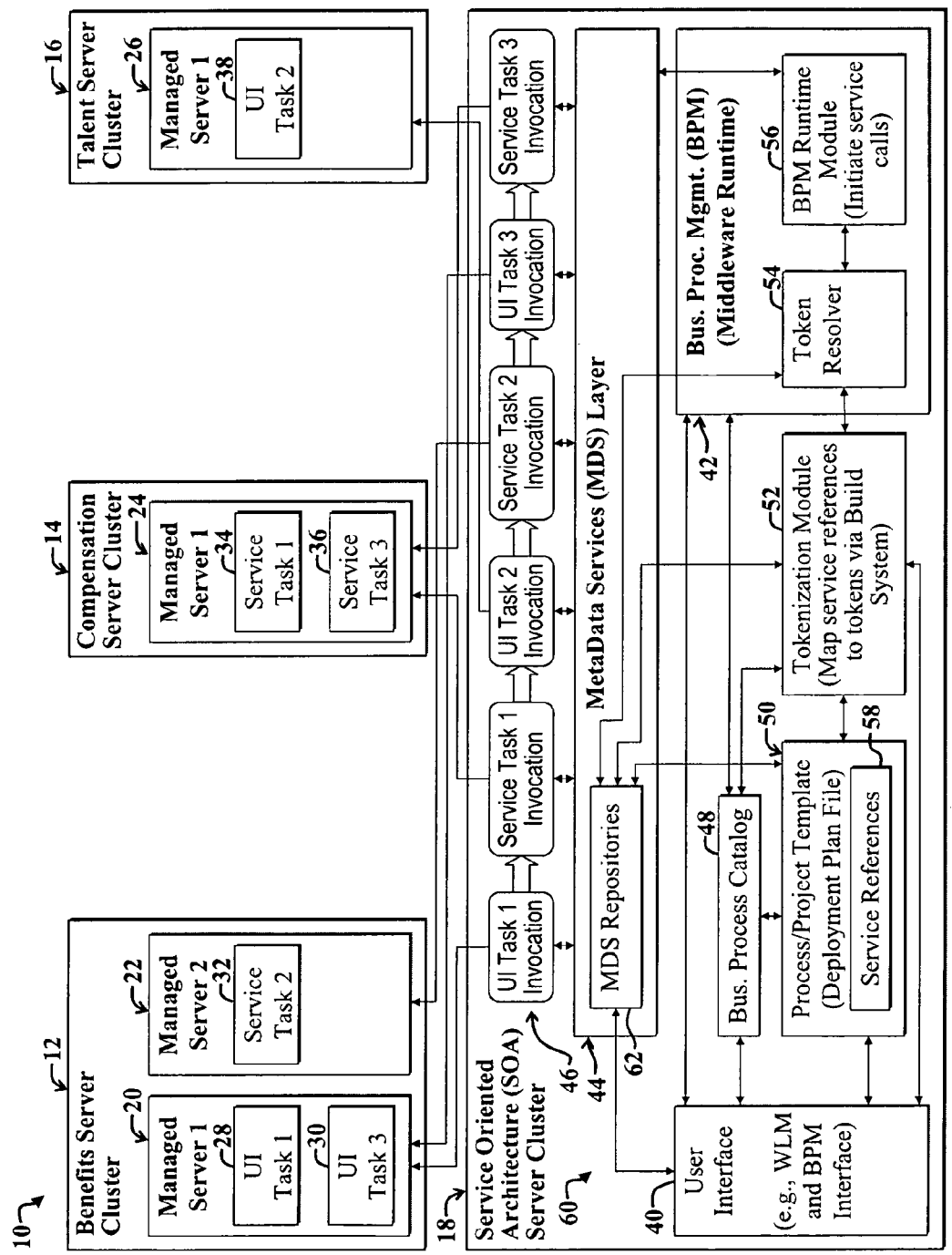
FIG. 1 is a diagram illustrating an example enterprise computing environment and accompanying system for facilitating automatic configuration and running of an application via a business process template.

FIG. 1 is a diagram illustrating an example enterprise computing environment 10 and accompanying system 60 for facilitating automatic configuration of and running of an application or portion thereof via a business process template 50.

The example computing environment 10 includes various server clusters 12-18, including a Service Oriented Architecture (SOA) server cluster 18 in communication with a benefits server cluster 12, a compensation server cluster 14, and a talent server cluster 16, which may be part of a so-called Human Capital Management (HCM) WebLogic domain.

The example HCM domain server clusters 12-16 include various managed servers 20-26, which host applications that provide various software services (e.g., Web services) 28-38 for implementing various software tasks, also called processes, including User Interface (UI) related tasks and service related tasks. In particular, the benefits server cluster 12 includes a first benefits managed server 20, which provides a first UI task service 28 and a third UI task service 30, and a second benefits managed server 22, which provides a second service task service 32. The compensation server cluster 14 includes a first compensation managed server 24, which provides a first service task service 34 and a third service task service 36. The talent server cluster 16 includes a first talent managed server 26, which provides a second UI task service 38.

For the purposes of the present discussion, a software service may be any computer code that is adapted to be called by an application (e.g., an application running on the SOA server cluster 18 and represented by a process template 50) whose code is stored in a separate location (e.g., on another computer or memory storage location or device) from the software service. Generally, software services provide functionality, e.g., capabilities, that may be reused by different applications or processes (that may be distributed across a network), which access the functionality via a predetermined interface, e.g., as specified via middleware, and consistent with a service description.

The term "functionality" may refer to or include any function or set of functions, actions, operations, mechanisms for performing a task via software and may further include software and/or hardware features that perform or facilitate performing or implementing one or more functions, capabilities, or tasks.

For the purposes of the present discussion, a process may be any sequence of one or more steps or tasks performed by a computer in accordance with computer code. Hence, execution of a function of an application may involve implementing a process.

A business process may refer to any process or software task performed in association with ERP software or that is otherwise used to facilitate implementing a task for a business or organization. A given process, e.g., business process, may include sub-processes. Certain processes and sub-processes may be implemented via one or more software services, e.g., Web services, also simply called services herein. An example of a business process includes launching software to facilitate onboarding or offboarding of enterprise employees.

The SOA server cluster 18 runs middleware for facilitating implementing various modules 40-58. The modules 40-58 are part of a system 60 for facilitating deploying processes or collections of processes as part of an application deployment specified in part via a business process template 50 (also simply called a process template or a project template herein), by tokenizing service references 58 included therein.

For the purposes of the present discussion, middleware may be any computer code that facilitates interfacing software and/or accompanying devices, thereby facilitating communications therebetween. Middleware may facilitate client-server communications, operating system-application communications, and so on.

An SOA server may be any server that is adapted to facilitate providing services accessible to one or more client computers coupled to a network. A server may be any computing resource, such as a computer and/or software that is adapted to provide content, e.g., data and/or functionality, to another computing resource or entity that requests it, i.e., the client. A client may be any computer or system that is adapted to receive content from another computer or system, called a server.

The example system 60 running on the SOA server cluster 18 includes a user interface 40 in communication with a Business Process Management (BPM) system 42 and a MetaData Services (MDS) layer 44. The example system 60 includes a business process catalog 48 and the business process template 50, which may be accessible to the user interface 40.

The user interface 40 may include Graphical User Interface (GUI) software and accompanying hardware (e.g., monitor, mouse, keyboard, etc.) for facilitating interacting with various modules 44-58 of the system 60, including the BPM system 42. The user interface 40 may include software for enabling software developers to develop applications by specifying contents of the business process template 50, which in certain implementations, may act as an application deployment plan file.

Furthermore, the user interface 40 includes GUI software that provides functionality for enabling a user to customize a business process template as per their business needs, such as by adding, deleting, and/or modifying service references and/or other process configuration information in the process template. Custom business process templates may be automatically tokenized when processes thereof are added to the business process template 50 from the exposed business process catalog 48. This alleviates the need for developers to know actual physical reference addresses of particular services when developing or customizing applications, as discussed more fully below. This can be particularly beneficial in fast deployment models and Software As A Service (SAAS) environments, where service host information and actual service reference addresses are often unknown to the user.

Note that fast deployment models (also called fast software architectures), are generally adapted to enable rapid movement and redeployment of software applications between different computer systems and networks. Such fast deployment models are often implemented via SAAS architectures, where end users, e.g., customers of a service provider, may be unaware of requisite service host information needed to properly specify service references for an application implemented via a business process template.

The user interface 40 may include additional software and accompanying functionality for testing applications and facilitating triggering deployment of the applications for use by various software running on other computers, e.g., client computers in communication with the network represented by the computing environment 10. The user interface 40 may also include computer code for triggering publishing of a business process template to an MDS repository 62 maintained via the MDS layer 44.

For the purposes of the present discussion, a business process template may be any file or collection of files that include a description or characterization of a software application or aspects thereof, such as a description of services to be called during application runtime to implement a set of processes; the order in which the services should be called, how a user interface of the application should be formatted, and so on.

A business process template that is published to the MDS repository 62 is accessible via various modules of the example system 60, including the BPM system 42. For the purposes of the present discussion, a Business Process Management (BPM) system may be any collection of computing resources, e.g., software, hardware, memory, and so on, that is adapted to facilitate management of middleware processes or integration of or intercommunication between software services and accompanying tasks. BPM systems may facilitate designing, modeling, executing, monitoring, and optimizing applications that involve employing distributed functionality, e.g., functionality that is provided as software services that may be located at different locations on a network.

For the purposes of the present discussion, an MDS repository (e.g., one of the MDS repositories 62) may be any file or collection of files and/or storage mechanisms for storing metadata. Metadata may be any data or information describing data or otherwise describing an application, a process, or set of processes or services.

The example system 60 includes a tokenization module 52 in communication with the business process catalog 48, the business process template 50, a token resolver 54, and the MDS layer 44. The tokenization module 52 includes computer code for mapping service references 58 in the business process template 50 into tokens, resulting in a tokenized business process template in response thereto. The tokenized business process template may be published to the MDS layer 44, i.e., maintained in one of the MDS repositories 62, which are accessible to other modules of the system 60 and accompanying middleware-based BPM system 42.

The tokenization module 52 may be implemented via a build system. A build system may be any computer code and accompanying system that is adapted to facilitate deploying or running software applications, e.g., by compiling source code, running tests, generating metadata, inserting tokens in place of service references, and so on.

For the purposes of the present discussion, a tokenized template may be any process template in which service address information, i.e., service references, are replaced with one or more tokens. A token may be any representation of a relative service reference that is readable by software to determine an actual (as opposed to relative) service reference. A relative service reference may be any specification of a service location that is relative to another location, e.g., the location of the associated process template. An actual service reference may be any specification of a service location that identifies a physical address identifying a service (or service component) location.

Note that tokenization of service references, as discussed herein, facilitates so-called domain independence, such that use of tokenization may enable triggering of services irrespective of the domain or network address from which the services are triggered to execute. A tokenized reference generally specifies computer code that may reference the business process catalog 48 to determine physical locations, i.e., actual service references (as opposed to relative service references), specifying network addresses, i.e., locations (called service component endpoints) of services and associated components specified by the original tokenized service reference.

Note that the tokenization module 52 may further translate statements, e.g., eXtensible Markup Language (XML) statements, occurring in the business process template 50, so as to facilitate automatically converting or encapsulating statements and references therein into a machine readable form that is domain independent in accordance with a token naming convention. The token naming convention may include a set of service reference mapping rules. For the purposes of the present discussion, a token naming convention (also simply called a naming convention) may be any set of rules and accompanying computer code or descriptions for converting a service reference, e.g., a relative service reference, to a token.

The token resolver 54 includes computer code 54 for retrieving a tokenized template from the MDS repository 62 and resolving tokenized references therein. A token is said to be resolved if it is machine interpreted to determine a physical service reference, i.e., actual (as opposed to relative) network path to a service or service component indicated by the token.

In the present example embodiment, resolved tokens are readable by a BPM runtime module 56, which includes computer code for triggering initiation of service calls corresponding to resolved tokenized references in a tokenized template.

Note that various modules shown in the computing environment 10 may be grouped or arranged differently than that shown. For example, various modules may be combined into similar modules, or functionality represented therein may be rearranged and included in other modules or may be otherwise distributed across a network, without departing from the scope of the present teachings. For example, the token resolver 54 and BPM runtime module 56 may be implemented as part of a single BPM runtime software component or module, without departing from the scope of the present teachings.

In the present example embodiment, when an application or project exhibiting a process flow as specified by a business project template is executed, the service references 58 are tokenized, then tokens of the resulting tokenized template are resolved before the associated services are invoked.

The user interface 40 may include computer code for enabling a user to trigger deployment and running of an application whose process flow is specified via a business process template. For example, a deployment signal may be generated in response to predetermined user input provided via the user interface 40. The deployment signal may be forwarded to the tokenization module 52, resulting in publishing of a tokenized business process template to the MDS repository 62. After deployment, a runtime signal may be forwarded from the user interface 40 to the BPM system 42, which may activate the token resolver 54 and BPM runtime module 56 to facilitate running processes in the business process template 50 in accordance with a process flow specified thereby.

Invocation of services 56 may be initiated in part via the BPM runtime module 56. In an example operative scenario, the BPM runtime module 56 includes computer code adapted to request and receive resolved tokens of a tokenized business process template from the token resolver 54, and to subsequently generate one or more service call signals, which may be forwarded to the MDS layer 44. The MDS layer 44 may employ middleware to manage strategic execution of the sequence of tasks 46, as specified in the tokenized process template stored in one or more of the MDS repositories 62.

While in the present example embodiment, the BPM runtime module 56 is shown employing the MDS layer 44 to call services to invoke the sequence of tasks 46, embodiments are not limited thereto. For example, in certain implementations, a BPM runtime module may directly call various services to implement a sequence of one or more software tasks or processes without employing an MDS layer to interface the BPM runtime module with the called services.

The sequence of tasks 46 represent processes implemented a particular order, i.e., in accordance with a process flow specified in the business process template 50. The sequence of tasks 46 includes separate software tasks, i.e., processes, to be performed by one or more services 28-38 hosted by one or more of the server clusters 12-16.

For example, when invoking a first UI task (UI Task 1), the actual address (i.e., service endpoint or reference) of the first UI task service 28 of the first managed server 20 of benefits server cluster 12 is determined with reference to a resolved token. When the first UI task service 28 is called via the MDS layer 44 in response to a signal from the BPM runtime module 56, the associated software task is performed.

In the present example embodiment, after the first UI task is performed by the associated service 28, a first service task (Service Task 1) is implemented in response to a call to the first service task service 34 running on the managed server 24 of the compensation server cluster 14. Similarly, subsequent software tasks are implemented, and the implementation is timed, in accordance with calls and accompanying process configuration information specified in the business process template 50.

For the purposes of the present discussion, invocation of a service task may be analogous to a Web service call. It the context of a process flow, invocation of a service task may be equivalent to a backend remote method invocation. Similarly, invocation of a UI task service may be equivalent to a UI Web service call. In general, UI task services are responsive to user input during process execution. A process flow that includes a process implemented via UI task service may wait for certain UI input before proceeding.

Various tasks 46 implemented in the present example embodiment via the example system 60 may affect, for example, user interface display screens and accompanying data and functionality displayed thereby of client computers that may be in communication with servers of the server cluster 12-16.

Example tasks that may be performed by one or more services (e.g., the second UI task service 38) of the talent server cluster 16 may include software processes that are adapted to provide services for facilitating automating employee talent or performance management operations. For the purposes of the present discussion, employee Performance Management (PM) may refer to any software or associated tasks for facilitating managing employee behavior and results. Hence, performance management may include processes or activities for ensuring that enterprise goals are met.

Similarly, tasks that may be performed by one or more services of the benefits server cluster 12 include adjusting benefits of an employee of an enterprise, e.g., in response to user input from Human Resources (HR) enterprise personnel. Similarly, tasks that may be performed by one or more services of the compensation server cluster 14 include adjusting compensation of an employee of an enterprise, e.g., in response to user input from HR enterprise personnel.

Note that a process automation template, such as the template 50, can include cross domain flows. For example, the process template 50 may reference Human Capital Management (HCM) services, Customer Relationship Management (CRM) services, and so on. The tokenization process accounts for domain differences. For example, for CRM services, the corresponding tokens may specify host and port information as follows: CRMServerHost:CRMServerPort.

Note that while in the present example embodiment, services and accompanying processes available to be called by the system 60 are cataloged in the business process catalog 48, embodiments are not limited thereto. For example, it is possible to adapt embodiments and extend concepts discussed herein to apply to the handling of and tokenization of external service references, without departing from the scope of the present teachings. Such implementations may include an additional registration module for registering physical addresses of service references and registering corresponding tokens for the services. A build system may then communicate with the registration module to facilitate tokenization of a template that calls registered services.

Alternatively, or in addition, certain implementations may accommodate non-tokenized references in combination with tokenized references. For example, so-called 3rd party services representing external service references that are not cataloged in the business process catalog 48 may be marked so that the external service references are not tokenized, but are instead specified as actual service references (as opposed to relative service references. In such cases, a deployment configuration plan file may facilitate accommodating external references. For example, a user, such as an application developer, may employ the user interface 40 to access systems management software (e.g., configuration management software) to facilitate ascertaining proper (e.g., actual) service references to be included in a deployment configuration plan file based on a created business process template. Accordingly, the user interface 40 may further include software in communication with a configuration plan file and systems management software.

For the purposes of the present discussion, systems management software may be any software that is adapted to facilitate service provisioning in accordance with a resource management policy. A configuration plan file may be any file that includes a description of a configuration of an application, such as an SOA composite application, where the description includes information specifying services to be called by the application. A configuration plan file may include specifications of Uniform Resource Locators (URLs) and property values to use in different environments. During process deployment, the configuration plan file is used to facilitate searching an application (e.g., SOA project) for values that are to be replaced to adapt the project to the next target environment.

In the present example embodiment, the tokenization module 52 or other module of the system 60 may include computer code for determining when a service reference in the business process template 50 does not correspond to a service identified in the process catalog 48, and then provide an indication in response thereto to the user interface 40. The user interface 40 may include computer code for facilitating providing a user option to replace one or more relative service references in the process template with one or more updated service references indicated by systems management software and maintained in a configuration plan file.

Note that in the present example embodiment, catalog information stored in the business process catalog 48 may include information used by the tokenization module 52 to eliminate the need for developers or other system users to know actual network paths, i.e., service references, to services specified in the process template 50. When a new service is properly cataloged in the business process catalog 48, the cataloging effectively enables automatic tokenization of the added service. This facilitates implementation of customized business process templates.

In summary, a build system implements the tokenization module 52, which can tokenize a developer-created and/or customized process template, such as the template 50, and then publish the resulting tokenized template to the MDS repository 62. Middleware runtime software 42, 44, including the BPM software 42, implements the token resolver module 54 which resolves the tokenized business process template retrieved from the MDS repository 62.

Figure 2:
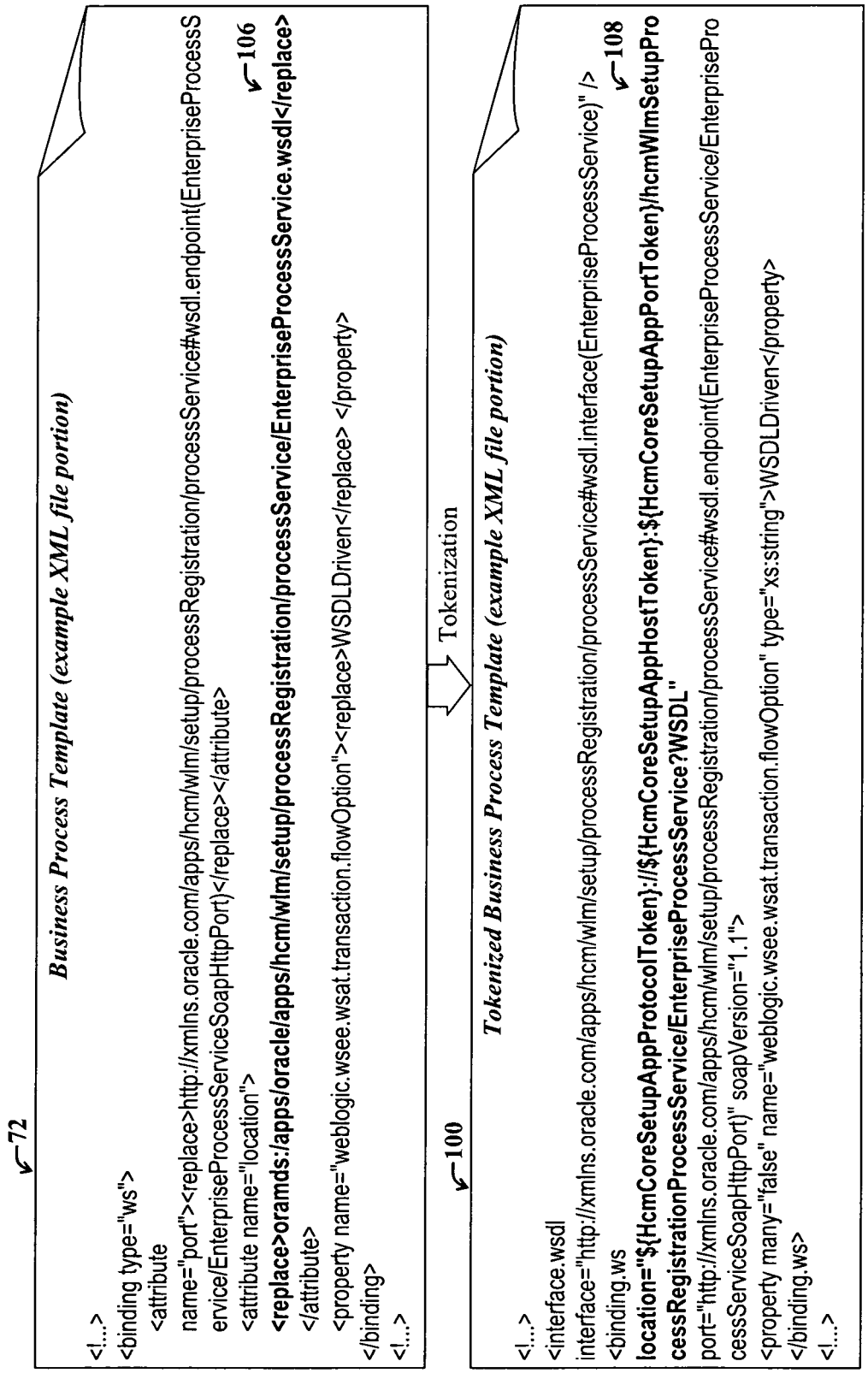
FIG. 2 illustrates a portion of an example business process template before and after tokenization of service references in the business process template via the tokenization module of FIG. 1.

FIG. 2 illustrates a portion of an example business process template before tokenization 72 and after tokenization 74 of service references in the business process template 72 via the tokenization module 52 of FIG. 1. With reference to FIGS. 1 and 2, the example business process template 72 is implemented as an eXtensible Markup Language (XML) file and includes an example service reference statement 106. The example service reference 106 may be one of the service references 58 of FIG. 1.

Tokenization of the business process template 72 via the tokenization module 52 of FIG. 1 results in a tokenized business process template 100. In the tokenized business process template 100, a tokenized service reference 108 represents a token corresponding to the service reference included in the example service reference statement 106 of the initial business process template 72.

Note that other statements included in the initial business process template 72 in addition to the service reference statement 106 may be modified in the resulting tokenized business process template 100 in accordance with the predetermined token naming convention. Exact details of the token naming convention used to tokenize a business process template are implementation specific. Those skilled in the art with access to the present teachings may readily determine and implement a token naming convention suitable for a given implementation, without undue experimentation.

Note that use of sub-tokens HcmCoreSetupAppProtocolToken, HcmCoreSetupAppHostToken, and HcmCoreSetupAppPortToken are employed to construct a virtual address for the service location specified by the initial service reference statement 106.

In summary, references to software services cataloged in the business process catalog 48 of FIG. 1 are tokenized when a business process template referring to the references is tokenized. Accordingly, when a business process template is customized by adding a new service reference corresponding to a newly cataloged software service in the business catalog 48 of FIG. 1, the new service reference is tokenized. The resulting tokenized service reference represents a specification of a new tokenized service call.

Accordingly, services cataloged in the business process catalog 48 of FIG. 1 are implicitly tokenized. This implicit business catalog tokenization obviates the need for a user, e.g., a developer, to obtain service endpoints for any software services cataloged in the business process catalog 48. Customizations to business process templates and accompanying processes are automatically enabled for direct deployment.

Note that certain embodiments discussed herein are not necessarily limited to employing business process templates only. For example, embodiments may be adapted to employ external (3$^{rd}$ party) service references that are fully qualified (environment specific) references. A deployment configuration plan file may be employed for external service references.

Figure 3:
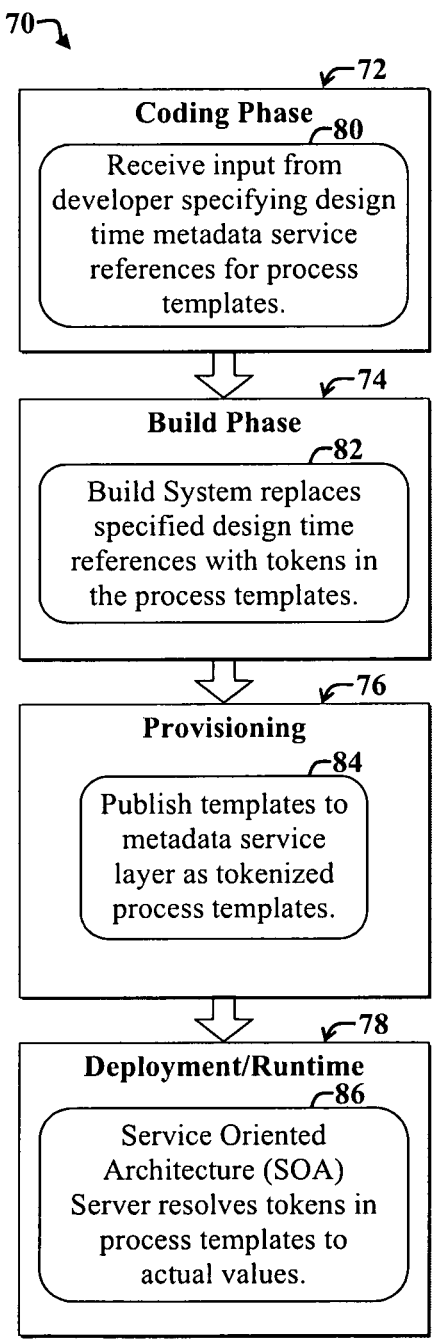
FIG. 3 shows an example process flow adapted for use with the system of FIG. 1.

FIG. 3 shows an example process flow 70 adapted for use with the system 60 and accompanying example enterprise computing environment 10 of FIG. 1. The example process flow 70 includes an initial coding phase 72.

The coding phase 72 may involve implementing a developer input step 80. The developer input step 80 includes receiving input from a developer specifying design time metadata service references for one or more business process templates.

A subsequent build phase 74 includes implementing a building step 82. The building step 82 includes employing a build system to replace specified design time service references with tokens in one or more business process templates used by one or more applications or projects.

Next, a provisioning phase 76 includes implementing a publishing step 84. The publishing step 84 includes publishing one or more business process templates to a metadata services layer as one or more tokenized business process templates.

Subsequently, a deployment phase 78 includes implementing a token resolving step 86. The token resolving step 86 includes employing a SOA server and accompanying software and resources to resolve one or more tokens in the one or more business process templates to actual values. The actual values represent actual descriptions of network address locations, i.e., endpoints, of applications that provide the referenced software services.

During the coding phase 72, user interface software may facilitate enabling a process developer or other user to create a business process template, also called a project template. Furthermore, the user interface software may facilitate user customization of templates, including adding, subtracting, and/or reordering of service references.

During the build phase 74 and provisioning phase 76, additional BPM software, which may leverage or be implemented via middleware may facilitate enabling a process analyst or other user to guide, monitor, control, and/or otherwise affect business process template tokenization and subsequent publishing to the metadata services layer.

During the deployment phase 78, BPM runtime software may facilitate resolving tokens in business process templates to actual values.

Implementation of the process 70 may enable independence from physical system configuration criterion such as host name, port number and protocol used; elimination of dependency on external tools such as Systems management software or Middleware WebLogic Scripting Tool (WLST) for retrieval of service endpoints (physical location of services); and portability of projects created from business process templates between test and production; and so on.

Figure 4:
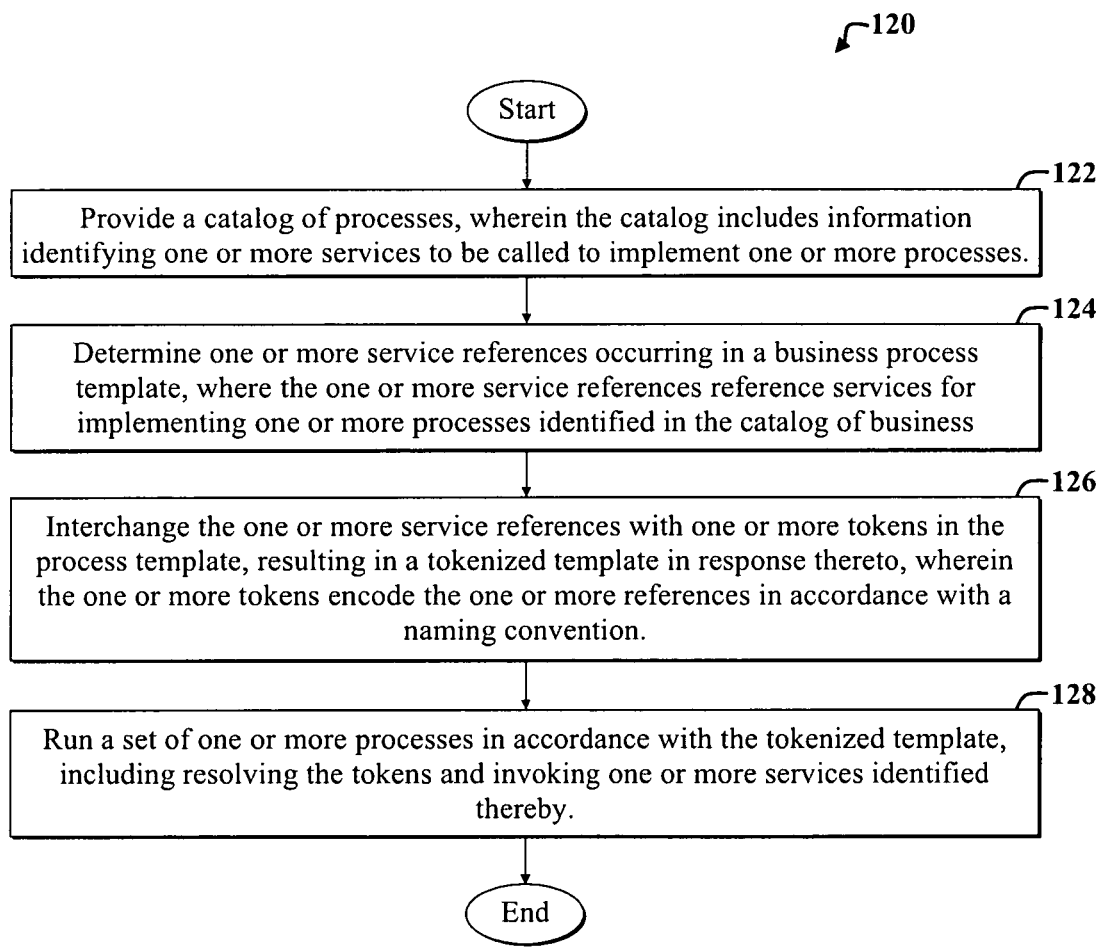
FIG. 4 is a flow diagram of an example method adapted for use with the embodiments of FIGS. 1-3.

FIG. 4 is a flow diagram of an example method 120 adapted for use with the embodiments of FIGS. 1-3. The example method 120 facilitates configuring software references that are called by a software application, such as a software application or portion thereof associated with and/or represented by a business process template. The example method 120 includes a first step 122, which involves providing a catalog of processes that includes information identifying one or more services to be called to implement one or more processes.

A second step 124 includes determining one or more service references occurring in a business process template that are used to implement one or more processes identified in the catalog of business processes.

A third step 126 includes interchanging the one or more service references with one or more tokens in the process template, resulting in a tokenized template in response thereto. The one or more tokens encode the one or more references in accordance with a naming convention.

A fourth step 128 includes running a set of one or more processes in accordance with the tokenized template, including resolving the tokens and invoking one or more services identified thereby.

Although the description has been described with respect to particular embodiments thereof, these particular embodiments are merely illustrative, and not restrictive. For example, while certain embodiments are discussed herein as being implemented in an enterprise computing environment, embodiments are not limited thereto. Other types of network computing applications may employ versions embodiments discussed herein, without departing from the scope of the present teachings.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for facilitating configuring one or more references to a software service to be called by a software application, the method comprising:
receiving a catalog of business processes, the catalog including information identifying a service to be called to implement a process, wherein the catalog of business processes is used to determine an actual service reference for the service in a business process template and implement the process for the service, and further wherein the actual service reference identifies a fixed physical network address for a service location corresponding to the service;
during a coding phase, receiving input specifying a design time relative service reference for the business process template;
during a build phase, using a tokenization module in communication with the catalog of business processes, wherein the tokenization module determines the relative service reference from the business process template, the relative service reference comprising a corresponding service address expressed relative to a location independent of the fixed physical network address for the corresponding service, and replaces the relative service reference in the business process template with a token representing the relative service reference, to yield a tokenized process template;
during a provisioning phase, publishing the tokenized process template to a MetaData Services (MDS) repository; and
during a deployment phase, using a token resolver module to resolve, based on the catalog of business processes, the token to an actual value representing the actual service reference, wherein resolving the token comprises:
identifying the fixed physical network address in accordance with the actual service reference;
locating the service at the fixed physical network address; and
invoking the located service.

2. The method of claim 1, wherein each token formed by the tokenization module encodes the relative service reference in accordance with a naming convention.

3. The method of claim 2, further including providing a user interface that enables a user to adjust configuration information specified in the business process template.

4. The method of claim 3, wherein the configuration information includes service references, and wherein the service references include one or more relative service references specifying one or more relative paths to the service.

5. The method of claim 1, wherein the tokenization module is in communication with the business process catalog, and a token resolver module communicates with the tokenization module to replace the design time relative service reference with the token.

6. The method of claim 5, further including BPM software, which includes a runtime module in communication with metadata services software, wherein the metadata services software facilitates referencing the tokenized template and invoking the service and one or more associated tasks identified thereby.

7. The method of claim 3, wherein the user interface includes user interface software in communication with the catalog of business processes and the business process template.

8. The method of claim 1, wherein the deployment phase includes employing a Service Oriented Architecture (SOA) server to resolve one or more tokens of the tokenized template.

9. The method of claim 8, further including middleware running a metadata services layer that selectively invokes performance of one or more tasks associated with the service identified in the business process template in response to a signal from BPM software.

10. The method of claim 9, wherein the one or more tasks include a task pertaining to adjusting benefits of an employee of an enterprise.

11. The method of claim 9, wherein the one or more tasks include a task pertaining to adjusting compensation of an employee of an enterprise.

12. The method of claim 9, wherein the one or more tasks include a task pertaining to employee performance management.

13. The method of claim 1, further including determining when a service reference in the business process template does not correspond to a second service identified in the catalog of business processes and providing an indication, in response thereto, to a user interface.

14. The method of claim 13, further including providing a user option to replace one or more relative service references in the business process template with updated service references indicated by systems management software and maintained in a configuration plan file.

15. An apparatus comprising: a digital processor coupled to a display and to a processor-readable storage device, wherein the processor-readable storage device includes one or more instructions executable by the digital processor to perform acts, which comprise:

receiving a catalog of business processes, the catalog including information identifying a service-to be called to implement a process, wherein the catalog of business processes is used to determine an actual service reference for the service in a business process template and implement the process for the service, and further wherein the actual service reference identifies a fixed physical network address for a service location corresponding to the service;

during a coding phase, receiving input specifying a design time relative service reference for the business process template;

during a build phase, using a tokenization module in communication with the catalog of business processes, wherein the tokenization module determines the relative service reference from the business process template, the relative service reference comprising a corresponding service address expressed relative to a location independent of the fixed physical network address for the corresponding service, and replaces the relative service reference in the business process template with a token representing the relative service reference, to yield a tokenized process template;

during a provisioning phase, publishing the tokenized process template to a MetaData Services (MDS) repository; and during a deployment phase, using a token resolver module to resolve, based on the catalog of business processes, the token to an actual value representing the actual service reference, wherein resolving the token comprises:

identifying the fixed physical network address in accordance with the actual service reference;

locating the service at the fixed physical network address; and invoking the located service.

16. A non-transitory processor-readable storage device including instructions executable by a digital processor, the processor-readable storage device including one or more instructions for:

receiving a catalog of business processes, the catalog including information identifying a service to be called to implement a process, wherein the catalog of business processes is used to determine an actual service reference for the service in a business process template and implement the process for the service, where the actual service reference identifies a fixed physical network address for a service location corresponding to the service;

during a coding phase, receiving input specifying a design time relative service reference for the business process template;

during a build phase, using a tokenization module in communication with the catalog of business processes, wherein the tokenization module determines the relative service reference from the business process template, the relative service reference comprising a corresponding relative service address expressed relative to a location independent of the fixed physical network address for the corresponding service, and replaces the relative service reference in the business process template with a token representing the relative service reference, to yield a tokenized process template;

during a provisioning phase, publishing the tokenized process template to a MetaData Services (MDS) repository; and during a deployment phase, using a token resolver module to resolve, based on the catalog of business processes, the token to an actual value representing the actual service reference, Wherein resolving the token comprises:

identifying the fixed physical network address in accordance with the actual service reference;

locating the service at the fixed physical network address; and invoking the located service.

\* \* \* \* \*

UNITED STATES PATENT AND TRADEMARK OFFICE
CERTIFICATE OF CORRECTION

PATENT NO. : 9,858,093 B2
APPLICATION NO. : 13/790475
DATED : January 2, 2018
INVENTOR(S) : Inamdar et al.

It is certified that error appears in the above-identified patent and that said Letters Patent is hereby corrected as shown below:

In the Claims

In Column 16, Line 31, in Claim 16, delete "Wherein" and insert -- wherein --, therefor.

Signed and Sealed this
Tenth Day of July, 2018

Andrei Iancu
*Director of the United States Patent and Trademark Office*